United States Patent [19]

Yancey

[11] 3,938,606
[45] Feb. 17, 1976

[54] TRACK-IDLER RECOIL SUSPENSION MECHANISM

[75] Inventor: John W. Yancey, Aurora, Ill.

[73] Assignee: Caterpillar Tractor Co., Peoria, Ill.

[22] Filed: Nov. 4, 1974

[21] Appl. No.: 520,459

[52] U.S. Cl. ................................ 180/9.5; 305/27
[51] Int. Cl.² ...................................... B62D 55/12
[58] Field of Search ............ 305/10, 16, 21, 22, 27, 305/28, 29; 180/9.5

[56] References Cited
UNITED STATES PATENTS

| | | | |
|---|---|---|---|
| 2,467,947 | 4/1949 | Skelton | 305/27 |
| 3,774,708 | 11/1973 | Purcell | 305/22 |
| 3,841,424 | 10/1974 | Purcell | 305/22 |

Primary Examiner—Philip Goodman
Attorney, Agent, or Firm—Phillips, Moore, Weissenberger Lempio & Strabala

[57] ABSTRACT

A combination track-idler and roller recoil suspension system is afforded through use of a crank member pivotally fixed to a track frame, and a link member pivotally fixed to an end of the crank member, and to which the idler is rotatably mounted. The other end of the crank member is associated with a resilient pad utilized as a mounting pad for a track roller, so that the resilient pad serves both as a suspension member for the roller, and as idler recoil means upon movement of the crank member. The link member accommodates generally vertical idler movement, through pivoting of the link member relative to the crank member.

11 Claims, 3 Drawing Figures

U.S. Patent  Feb 17, 1976  3,938,606
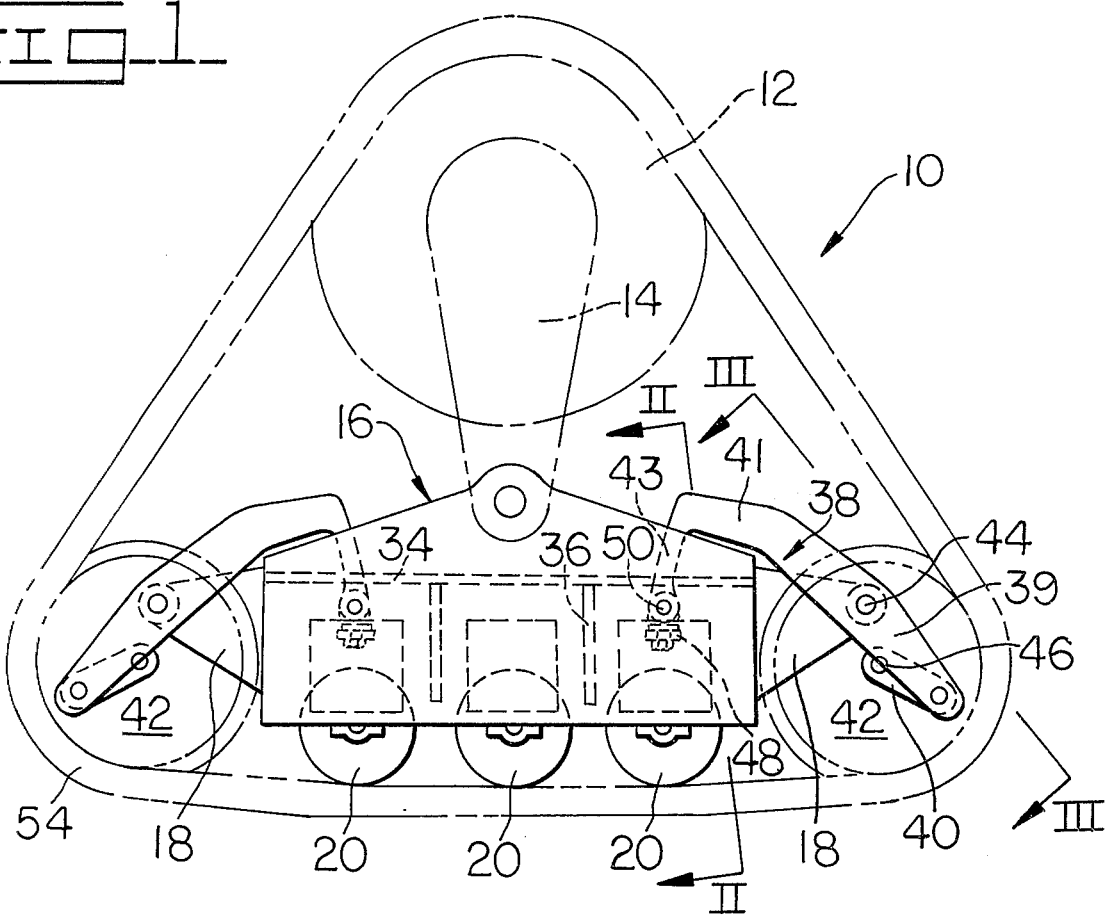
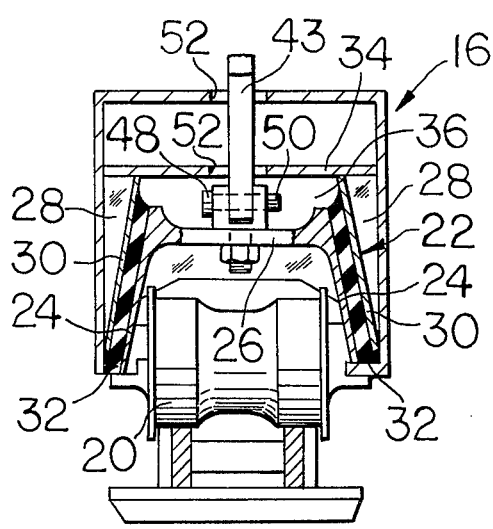
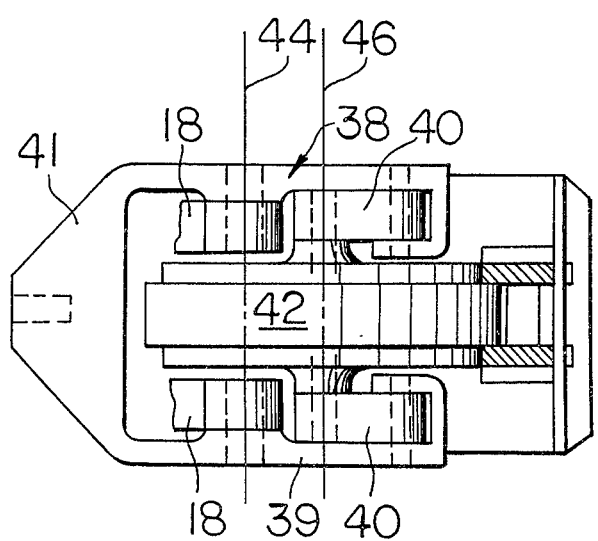

TRACK-IDLER RECOIL SUSPENSION MECHANISM

BACKGROUND OF THE INVENTION

This invention relates to vehicle suspension systems, and more particularly, to a suspension system allowing for both generally vertical and recoil movement of an idler of the suspension system.

Efficient roller suspension mountings are disclosed in U.S. Pat. No. 3,336,087 to Reinsma, and U.S. Pat. No. 3,695,737 to Alexander et al., both assigned to the assignee of this invention. In each of these patents, resilient means are disposed between roller mounting means and a portion of the track frame, so that such portion of the track frame may be properly supported by such rollers through the associated resilient members, with the resilient members allowing a degree of suspension movement of the rollers relative to the track frame. U.S. Pat. No. 3,774,708, assigned to the assignee of this invention, also discloses a system wherein resilient pads are disposed between roller mounting means and a portion of the track frame, so that such rollers provide support for a portion of the track frame.

Each of the systems of the above-cited patents with advantage includes a recoil system for providing proper idler suspension and idler recoil during the operation of the vehicle. While such systems may operate in an extremely effective manner, it is to be understood that, for certain applications, even more advantageous and efficient suspension can be provided. For example, it has been recognized that under certain conditions, it would be extremely advantageous to utilize compression of the resilient pads of, for example, U.S. Pat. No. 3,336,087, to allow idler recoil. Additionally, it must be insured that the idler, while being capable of such recoil, may properly move in a generally upward and downward direction to provide proper suspension movement.

Of more general interest in this area are U.S. Pat. No. 2,467,947 to Skelton, U.S. Pat. No. 3,332,725 to Reinsma, and U.S. Pat. No. 3,343,889 to Bexten.

SUMMARY OF THE INVENTION

It is accordingly an object of this invention to provide a suspension system for a vehicle, such suspension system including an idler and rollers, wherein resilient means associated with a roller accommodate recoil of the idler.

It is a further object of this invention to provide a suspension system for a vehicle which, while fulfilling the above objects, allows for generally vertical movement of the idler for proper suspension of the vehicle.

It is a still further object of this invention to provide a suspension system for a vehicle which, while fulfilling the above objects, is extremely stable under reaction loads placed thereon.

It is a still further object of this invention to provide a suspension system for a vehicle which, while fulfilling the above objects, is extremely simple in construction and efficient in operation.

Broadly stated, the invention is in a vehicle having frame means. Such invention comprises a rotatable member, and a crank member pivotally mounted to the frame means. A link member is pivotally mounted to the crank member, and the rotatable member is rotatably mounted to the link member. The link member is positioned relative to the vehicle to allow a degree of upward and downward motion of the rotatable member through pivotal movement of the link member relative to the crank member.

BRIEF DESCRIPTION OF THE DRAWINGS

These and other objects of the invention will be apparent from a study of the following specification and drawings, in which:

FIG. 1 is a side view of a triangular track suspension incorporating the invention;

FIG. 2 is a sectional view taken along the line II—II of FIG. 1;

FIG. 3 is a view, partially in section, taken along the line III—III of FIG. 1.

DESCRIPTION OF THE PREFERRED EMBODIMENT

Shown in FIG. 1 is a triangular track arrangement 10 associated with a vehicle (not shown). The track arrangement 10 includes an elevated drive sprocket 12, mounted to a frame portion 14 fixed to the vehicle. Such frame portion 14 has pivotally mounted thereto a frame part 16, which has brackets 18 fixed thereto and extending therefrom on either side thereof. The frame part 16 has associated therewith individual track rollers 20, one of which is shown in FIG. 2. As shown therein, such roller 20 is rollingly associated with a roller mounting structure 22 which includes angled plates 24, and a rigid horizontal plate 26 fixed thereto. Wedge-shaped spacers 28 are fixed to the frame part 16 inwardly of the sides thereof, and protective plates 30 are in turn fixed to the wedge-shaped spacers. Disposed between each adjacent pair of plates 24, 30 is a resilient pad 32. To facilitate manufacture and service, these pads 32 are normally bonded to their respectively associated plates 24, as well as to their respectively associated plates 30. The structure forming frame part 16 includes internal support plates 34 and vertically disposed cross braces 36 to assure necessary structural integrity.

Each roller 20 is associated with the frame part 16 in the manner so far described. It is to be seen that the resilient pads 32 interconnect the frame part 16 and the roller mounting structure 22, so that each roller 20 supports a portion of the frame part 16 through the resilient pads 32.

Pivotally fixed to a pair of brackets 18, is a crank member 38, and link members 40 are pivotally mounted to such crank member 38. A rotatable idler 42 is rotatably mounted to the link members 40 as shown, i.e., a portion 39 of the crank member 38 extends on one side of the crank member-frame part pivot axis 44 beyond the axis of rotation 46 of the rotatable idler 42, with the link members 40 being pivotally mounted to that one portion of the crank member 38 beyond the axis of rotation 46 of the rotatable idler 42 in such extended direction. Another, generally opposite portion 41 of the crank member 38 extends on the other side of the crank member-frame part pivot axis 44, and includes a portion 43 extending generally downwardly therefrom. Such downwardly extending portion 43 is pivotally fixed to a bracket 48 by means of pin 50, and such bracket 48 is in turn fixed to horizontal plate 26 as shown in FIG. 2. Suitable apertures 52 are provided in frame part 16 to allow the passage of downwardly extending portion 43 therethrough as shown.

It will be seen that a like crank member 38, link members 40 and idler structure is associated with brackets 18 at the opposite end of the frame part 16. A track chain 54 is disposed about the idlers and drive sprocket as shown.

With the parts in position as shown for operation, the link members 40 are positioned relative to the vehicle to allow a degree of upward and downward motion of the idler 42 through pivotal movement of the link members 40 relative to the crank member 38. The track chain 54 is of course in contact with a portion of the idler 42, and the link members 40 are positioned so that the longitudinal axes thereof are aligned substantially parallel with a resultant force placed on the idler 42 by the track chain 54. Such particular positioning of the link members 40 results in the fact that the idler 42 is stably and properly placed for optimum operation thereof. The crank member-frame part pivot axis 44 is disposed positionally above the longitudinal axes of the link members 40. This results in the fact that resultant force placed on the idler 42 by the track chain 54, such force being placed generally parallel to the longitudinal axes of the link members 40, tends to pivot track frame portion 39 downwardly and track frame portion 41 upwardly, so that the the resilient pads 32 are properly utilized to accommodate such load.

It is to be seen that, through the particular placement of crank member 38, link members 40, and the association of the crank member 38 with the resilient pads 32, force placed on the idler 42 tending to provide idler recoil (i.e., the right-hand idler 42 moving to the left as shown in FIG. 1) tends to pivot the portion 39 of the crank member 38 downwardly, and the portion 41 of the crank member 38 upwardly about the pivot axis 44. Such upward movement of the crank member portion 41 puts the resilient pads 32 in both compression and shear, so that it will be seen that recoil of the idler 42 is taken up and accommodated by the resilient pads 32.

The pivot axis associating frame part 16 with frame portion 14 is positioned substantially along the line of reaction force placed on the idler 42 by the track 54. Such placement aids in providing a stable and efficient suspension operation.

It is to be understood that the opposite idler 42, link members 40, and crank member 38 are associated with resilient pads operating with a roller 20 in an identical manner.

In practice, with a preload of approximately 12,000 lbs. placed on the resilient pads 32 associated with roller 20, a 2 inch compression of the pads 32 would normally result in approximately 55,000 lbs. of force resisting recoiling force. It is to be understood that varying mechanical advantages can be afforded by relocation of pivot axes 44, alteration of the length of link members 40 and crank members 38, and variations in the size and/or thickness of the resilient mounting pads 32.

It will be seen that herein is provided a combination track roller and idler recoil suspension mechanism which affords proper idler vertical displacement and recoil to effectively cushion out detrimental road shock. The components utilized are extremely simple, and may be sized accurately to provide a chosen mechanical advantage. Recoil springs of the conventional type are completely eliminated, and the resilient pads 32 included in the device are utilized in an extremely efficient manner, both for track roller support, and for accommodation of such idler recoil.

What is claimed is:

1. In a vehicle having frame means, a rotatable member, a crank member pivotally mounted to said frame means, a link member pivotally mounted to said crank member, and to which the rotatable member is rotatably mounted, said link member being positioned relative to the vehicle to allow a degree of upward and downward motion of the rotatable member through pivotal movement of the link member relative to the crank member, wherein one portion of the crank member extends on one side of the crank member-frame means pivot axis beyond the axis of rotation of the rotatable member, and the link member is pivotally mounted to said one portion of the crank member beyond the axis of rotation of the rotatable member in said extended direction, and comprising track means in contact with a portion of the rotatable member, the link member having its longitudinal axis aligned generally parallel with a resultant force placed on the rotatable member by said track means.

2. The vehicle of claim 1 wherein the crank member-frame means pivot axis is disposed positionally above the longitudinal axis of the link member.

3. The vehicle of claim 2 wherein another portion of the crank member extends on the other side of the crank member-frame means pivot axis, and comprising resilient means associated with the frame means, and means associating the resilient means and said another portion of the crank member so that said resilient means resiliently resist pivoting of the crank member upon application of force thereto tending to pivot said one portion of the crank member downwardly.

4. The vehicle of claim 3 and further comprising a roller, and roller mounting means, said resilient means interconnecting the frame means and roller mounting means so that the roller supports a portion of the frame means through the resilient means.

5. The vehicle of claim 4 wherein the means associating the resilient means and said another portion of the crank means comprise said roller mounting means, and means for interconnecting the roller mounting means and said another portion of the crank member.

6. The vehicle of claim 5 wherein the frame means comprise a first frame portion, and a second frame portion pivotally mounted to the first frame portion and to which the crank member is pivotally mounted, and with which the resilient means are associated.

7. The vehicle of claim 6 wherein the first frame portion-second frame portion pivot axis is positioned substantially along the line of a reaction force placed on the rotating member by the track means.

8. In a vehicle having frame means, a rotatable member, a body member mounted to said frame means, a link member pivotally mounted to said body member, and to which the rotatable member is rotatably mounted, wherein a portion of the body member extends from the frame means beyond the axis of rotation of the rotatable member, and the link member is pivotally mounted to said portion of the body member beyond the axis of rotation of the rotatable member in said extended direction, said link member being positioned relative to the vehicle to allow a degree of upward and downward motion of the rotatable member through pivotal movement of the link member relative to the body member, and comprising track means in contact with a portion of the rotatable member, the link member having its longitudinal axis aligned generally parallel with a resultant force placed on the rotatable member by said track means.

9. In a vehicle having frame means, a rotatable member, a crank member pivotally mounted to said frame means and having one portion extending on one side of the crank member-frame means pivot axis, said rotatable member being associated with said one portion, a roller, roller mounting means, resilient means interconnecting the frame means and the roller mounting means so that the roller supports a portion of the frame means through the resilient means, wherein said crank member includes another portion extending on the other side of the crank member-frame means pivot axis, and means associating the resilient means and said another portion of the crank member so that said resilient means resiliently resist pivoting of the crank member upon application of force thereto tending to pivot said crank member.

10. The vehicle of claim 9 wherein said resilient means resiliently resist pivoting of the crank member upon application of force thereto tending to pivot said one portion of the crank member downwardly.

11. The vehicle of claim 10 wherein the means associating the resilient means and said another portion of the crank member comprise said roller mounting means, and means for interconnecting the roller mounting means and said another portion of the crank member.

* * * * *